United States Patent
Peng

(10) Patent No.: US 7,849,783 B2
(45) Date of Patent: Dec. 14, 2010

(54) PLASTIC SHOES FOR COMPRESSORS

(75) Inventor: Yuan Peng, Marlton, NJ (US)

(73) Assignee: GGB, Inc., Thorofare, NJ (US)

( * ) Notice: Subject to any disclaimer, the term of this patent is extended or adjusted under 35 U.S.C. 154(b) by 228 days.

(21) Appl. No.: 11/755,394

(22) Filed: May 30, 2007

(65) Prior Publication Data

US 2007/0277671 A1      Dec. 6, 2007

Related U.S. Application Data

(60) Provisional application No. 60/809,777, filed on May 31, 2006.

(51) Int. Cl.
*F04B 1/14* (2006.01)
*F04B 27/08* (2006.01)

(52) U.S. Cl. .............................. 92/153; 92/71
(58) Field of Classification Search ............. 92/71, 92/153; 417/269
See application file for complete search history.

(56) References Cited

U.S. PATENT DOCUMENTS

| 3,221,564 | A | | 12/1965 | Raymond |
|---|---|---|---|---|
| 4,268,225 | A | | 5/1981 | Nakayama et al. |
| 4,347,046 | A | * | 8/1982 | Brucken et al. ............. 417/269 |
| 4,617,856 | A | * | 10/1986 | Miller et al. .................... 92/71 |
| 4,641,570 | A | * | 2/1987 | Futamura et al. ............... 92/71 |
| 5,013,219 | A | * | 5/1991 | Hicks et al. .................. 417/269 |
| 5,554,020 | A | | 9/1996 | Rao et al. |
| 5,758,566 | A | | 6/1998 | Jepsen et al. |
| 5,813,315 | A | | 9/1998 | Kristensen et al. |
| 5,950,480 | A | * | 9/1999 | Fukushima ............... 29/888.02 |
| 6,422,129 | B1 | | 7/2002 | Yokomachi et al. |
| 6,644,172 | B1 | * | 11/2003 | Nakayama et al. ............ 92/153 |
| 2006/0081125 | A1 | | 4/2006 | Farrell |

FOREIGN PATENT DOCUMENTS

| EP | 0 230 131 A2 | 7/1987 |
|---|---|---|
| EP | 0 794 330 A2 | 9/1997 |
| JP | 10 122139 A | 5/1998 |

OTHER PUBLICATIONS

International Searching Authority. "Notification of Transmittal of the International Search Report and the Written Opinion or the International Searching Authority, or the Declaration" Nov. 27, 2007.

* cited by examiner

*Primary Examiner*—Thomas E Lazo
(74) *Attorney, Agent, or Firm*—Holland & Hart LLP

(57) ABSTRACT

Embodiments of the present invention are disclosed herein. One embodiment of a bearing for a piston engine has a bearing made of a plastic material and having a substantially planar base and a substantially hemispherical portion. The base is configured to engage with a swash plate, and the hemispherical portion is configured to engage with a piston.

14 Claims, 4 Drawing Sheets

PLASTIC SHOES FOR COMPRESSORS

CROSS-REFERENCES TO RELATED APPLICATION

This application claims priority to U.S. Provisional Patent Application No. 60/809,777, filed May 31, 2006, entitled "Plastic Shoes for Compressors," the entirety of which is incorporated by reference.

FIELD OF THE INVENTION

The present invention relates generally to compressors. The present invention relates more specifically to shoes for swash plate-type compressors.

BACKGROUND

A conventional swash plate compressor comprises a piston reciprocally moved by the rotation of a swash plate fixed to a drive shaft. The swash plate is a rigid plate or disc, typically made of low-carbon steel or a high silicon-zinc-copper alloy, which is affixed to a drive shaft. The drive shaft runs through the center of the swash plate at an angle such that the swash plate is not mounted perpendicularly to the drive shaft. This mounting angle causes the swash plate to 'wobble' as the drive shaft rotates. This wobble is used to drive one or more pistons.

The swash plate and a contact portion of a piston are engaged through a pair of hemispherical shoes, which are typically made of steel or other metals or alloys. Each of the shoes has a hemispherical surface which engages with the contact surface of the piston, and a flattened portion to engage the swash plate. The shoes engage the swash plate, and, as the swash plate rotates, the shoes are forced to move by the motion of the swash plate as it rotates about its axis. As the shoes move, they force the piston to move between the two ends of a cylinder.

A significant problem in swash plate compressors is maintaining sufficient lubrication between the swash plate and the shoes. The slidability and the seizure resistance between the flattened surface of the shoe and the surface of the swash plate are important in order to assure the operability and the durability of the compressor as a whole.

To create sufficient lubrication between the swash plate and the shoes, the swash plate is typically plated with tin (Sn) or molybdenum disulfide ($MoS_2$), both of which exhibit excellent lubrication properties. Alternatively, a thermally-applied solid lubricant, such as a leaded tin-bronze coating may be used. Thus, a soft-surface treatment layer having a lubricity is produced. Other attempts to provide lubricity between the swash plate and shoes have been primarily directed to applying lubricating coatings to the swash plate.

However, there are manufacturing expenses involved in applying a lubricating coating or plating to a swash plate. Applying the tin or $MoS_2$ plating is a complex process, and applying the tin-bronze coating uses an expensive thermal spray process. Thus, it would be advantageous if more cost-effective method or product for maintaining lubricity between the shoes of a compressor and a swash plate could be used, while maintaining the level of performance of existing swash plate compressors.

SUMMARY

A bearing for a compressor according to one embodiment of the present invention comprises a plastic material. The bearing has a substantially planar base and a substantially hemispherical portion. The base is configured to engage with a swash plate, and the hemispherical portion is configured to engage with a piston.

This illustrative embodiment is mentioned not to limit or define the invention, but to provide examples to aid understanding thereof Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1B:
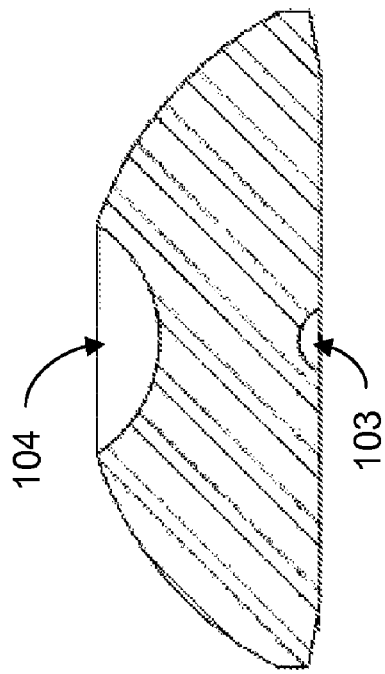
FIGS. 1A-F show illustrations of a bearing according to one embodiment of the present invention.
Figure 1A:
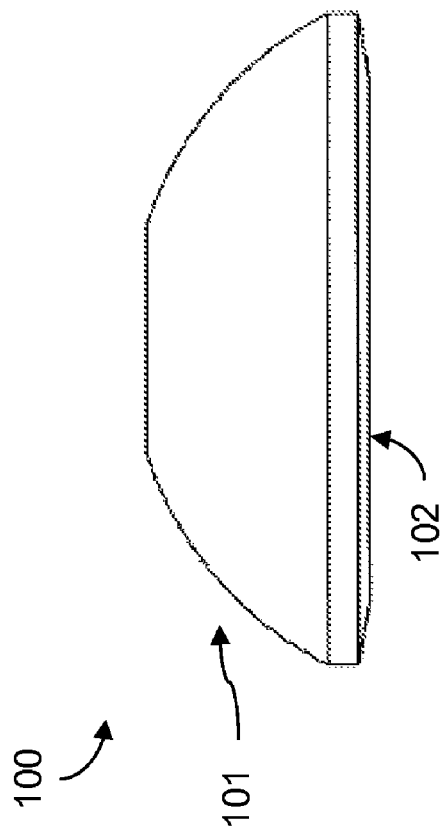
Figure 1D:
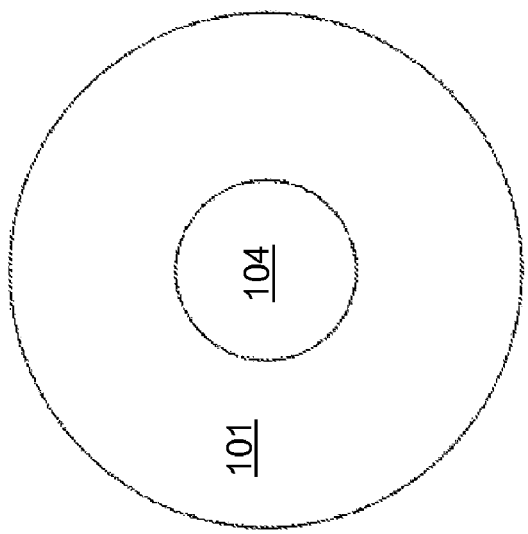
Figure 1C:
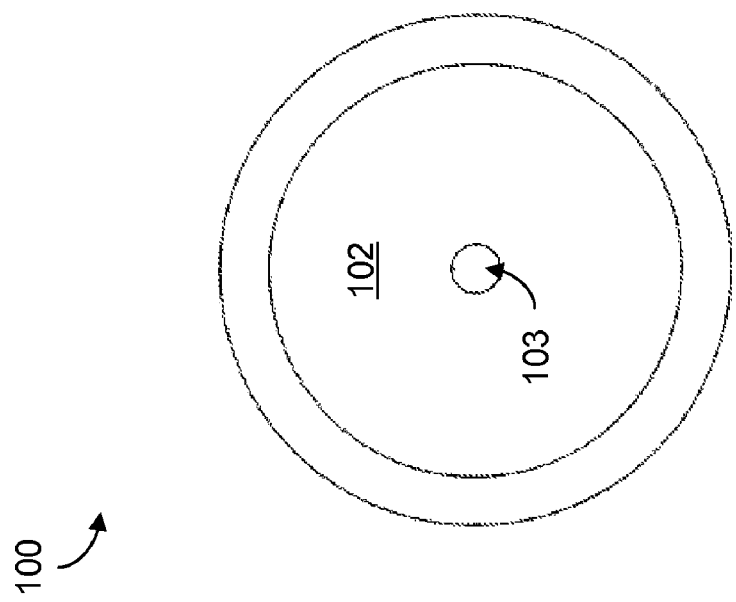
Figure 1F:
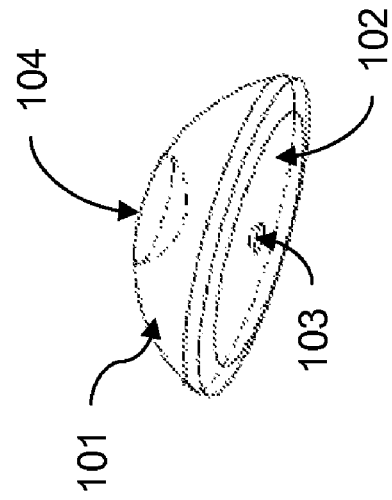
Figure 1E:
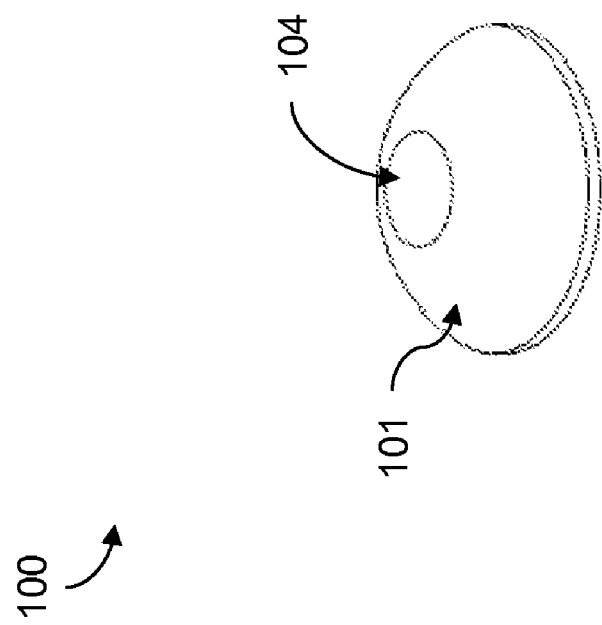

Embodiments of the present invention comprise plastic bearings. Referring now to the drawings in which like numerals refer to like elements throughout the several figures, FIGS. 1A-F show a bearing according to one embodiment of the present invention. In the embodiment shown, a bearing 100 comprises a substantially hemispherical surface 101, and a substantially planar base 102. The substantially hemispherical surface 101 in the embodiment shown in FIGS. 1A-F comprises less than a full hemispherical arc (of approximately 180 degrees), however, the surface has a generally spherical curvature. The term 'hemisphere' or 'hemispherical' shall include surfaces having a generally spherical curvature, but with an arc of greater than or less than 180 degrees. Additionally, "hemisphere" or "hemispherical" shall also include other curved surfaces, including parabolic and other non-spherically-curved surfaces. The substantially hemispherical surface 101 is configured to engage with a piston as will be described in more detail with respect to FIG. 2, below.

In the embodiment shown in FIGS. 1A-F, the substantially planar base 102 is coupled to the substantially hemispherical surface 101 and is configured to engage with a swash plate, which will be described in more detail with respect to FIG. 2 below. As may be seen in FIG. 1B, substantially planar base 102 defines a small cavity 103. Small cavity 103, in the embodiment shown in FIG. 1B is configured to contain oil or another lubricant. For example, engine oil may become trapped within cavity 103, which may provide a reservoir of oil to aid in the lubrication between the bearing 100 and a swash plate. While the embodiment shown in FIG. 1 comprises cavity 103, other embodiments may comprise more than one cavity or no cavities. For example, according to one embodiment of the present invention, a bearing having a substantially planar surface defines three cavities in which oil or other lubricants may be trapped. In one embodiment of the present invention, a bearing having a substantially planar surface defines no cavities. In the embodiment shown in FIG. 1, cavity 103 comprises a substantially hemispherical shape. However, the shape of cavity 103 may vary according to different embodiments of the present invention. For example, in one embodiment, cavity 103 may comprise a rectangular shape or a groove. In one embodiment of the present invention, cavity 103 may comprise an irregular shape.

Bearing 100, in the embodiments shown in FIGS. 1A-1F, also comprises an upper cavity 104 defined in the substantially hemispherical surface 101. In the embodiment shown, upper cavity 104 results from a manufacturing process, but does not substantially interfere with the function of the bearing. In one embodiment, a bearing 100 does not comprise an upper cavity 104. In one embodiment, a bearing 100 comprises a plurality of upper cavities.

Bearings according to embodiments of the present invention comprise plastic materials. For example, in the embodiment shown in FIGS. 1A-F, the bearing 100 comprises a polyamide imide. In one embodiment, bearing 100 comprises a polyamide imide sold under the trade name EP79™. In one embodiment of the present invention, bearing 100 comprises other materials, such as at least one of polyphenylene sulfide, polyether ether ketone, or polyimide. In some embodiments of the present invention, the plastic material may comprise additional materials, such as materials to improve performance characteristics, such as lubricity and/or wear resistance. For example, in one embodiment, a bearing 100 comprises a plastic material comprising EP79™, polytetrafluoroethylene (PTFE), and carbon fiber. In one embodiment, the plastic material comprises approximately 20-30% by weight PTFE and carbon fiber. In such an embodiment, the carbon fiber and PTFE are at a ratio of approximately 1:1. In other embodiments, other ratios of carbon fiber and PTFE may be used. For example, in one embodiment, the carbon fiber and PTFE are at a ratio of approximately 1:2. In one embodiment, the plastic material comprises less than 20% by weight PTFE and carbon fiber. In still a further embodiment, the plastic material comprises more than 30% by weight PTFE and carbon fiber. A bearing 100 comprising a mixture of EP79™, PTFE, and carbon fiber may exhibit increased lubricity and durability characteristics. Other embodiments may comprise fewer additives. For example, in one embodiment of the present invention, a bearing 100 may comprise a plastic material comprising EP79™ and PTFE, while in another embodiment of the present invention, a bearing 100 may comprise a plastic material comprising EP79™ and carbon fiber. Still further embodiments may comprise additional lubricating additives or strengthening additives. For example, in one embodiment of the present invention, a plastic material may comprise EP79™ and compounds such as graphite, molybdenum disulfide, bronze, Kevlar™, or other additives known to those of ordinary skill in the art.

Other suitable plastic materials may be used in embodiments of the present invention. For example, a suitable plastic material may have certain physical properties. In one embodiment, a suitable plastic material may have a glass transition within a sufficiently high temperature range. For example, in one embodiment, a suitable plastic material may have a glass transition temperature between approximately 250 and 350 degrees Celsius. In other embodiments, such as one embodiment for use in a high-temperature application, a suitable plastic material may have a glass transition temperature of greater than 350 degrees Celsius. Further embodiments have glass transition temperatures below 250 degrees Celsius.

A property of a suitable plastic material may be specific gravity. For example, in one embodiment, a suitable plastic material may comprise a specific gravity between approximately 1.25 and 1.75. Plastic materials with specific gravities outside of this range may be suitable as well. For example, a suitable plastic material may have a specific gravity of greater than 1.75, or a specific gravity of less than 1.25. For example, in one embodiment, the glass transition temperature may be of high importance, while the specific gravity may be of less importance. In such an embodiment, a suitable plastic material may have a carefully selected glass transition temperature, but a specific gravity less than 1.25 or greater than 1.75. Such considerations may be applicable for other embodiments of the present invention, wherein one or more properties may be of primary importance, while remaining properties may be of lesser importance, and may fall outside of an ideal range.

The physical strength of the plastic material may be an important property in embodiments of the present invention. Properties relating to physical strength may comprise compressive strength and tensile strength. In one embodiment of the present invention, a suitable plastic material may comprise a compressive strength between approximately 17,000 and 25,000 pounds per square inch (17 to 25 ksi). In one embodiment of the present invention for use in applications with very high compressive stresses, a suitable plastic material may have a compressive strength greater than 25 ksi. Other embodiments may comprise a compressive strength of less than 17 ksi. In one embodiment, a suitable plastic material may comprise a tensile strength between approximately 12 and 18 ksi. In other embodiments, a suitable plastic material may have a tensile strength of less than 12 ksi, or more than 18 ksi.

In one embodiment, a suitable plastic material may have a heat deflection temperature between approximately 250 and 325 degrees Celsius. In a high-temperature application, an embodiment of the present invention comprises a suitable plastic material may have a heat deflection temperature greater than 325 degrees Celsius. In one embodiment, a bearing comprises a suitable plastic material having a heat deflection temperature of less than 250 degrees Celsius.

In one embodiment, a bearing comprising a suitable plastic material may comprise a combination of some of the properties within the above ranges, while having other of the foregoing properties outside of the above ranges. One embodiment of the present invention may comprise properties within all of the above ranges. Further, one embodiment of the present invention may comprise properties outside all of the above ranges.

Figure 2:
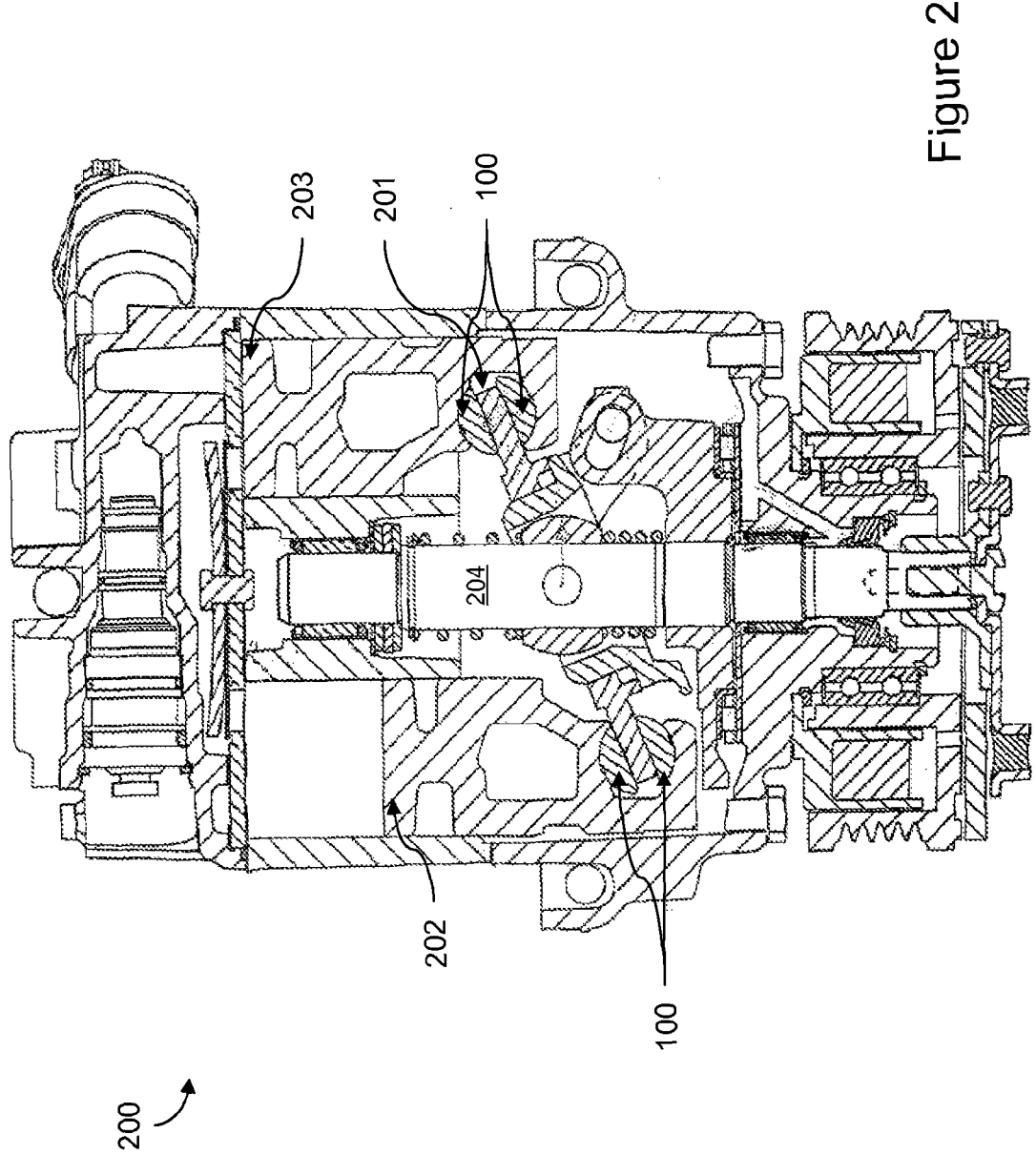
FIG. 2 shows an illustration of bearings according to one embodiment of the present invention within a piston engine.

Referring now to FIG. 2, a piston engine 200 comprises bearings 100 according to one embodiment of the present invention. In the embodiment shown in FIG. 2, piston engine 200 comprises two pistons 202, 203, a swash plate 201, and a plurality of bearings 100. The swash plate 201 engages two bearings 100, one on each of the upper and lower surfaces of the swash plate 201. Each bearing 100 slidably engages the swash plate with the substantially planar surface of the bearing 100, but the bearings 100 do not rotate with the swash plate. The shoes each slidably engage one of a plurality of contact surfaces of a piston. The bearings 100 remain engaged with a piston, and the swash plate 201 rotates past the bearings. As the swash plate 201 rotates with the crankshaft 204, the motion of the swash plate, which is mounted at an angle of less than 90 degrees with respect to the rotation axis of the crankshaft, is converted to a translational force by the bearings 100. The substantially hemispherical surface of the bearings 100 may advantageously allow the orientation of the bearing to smoothly change with respect to the piston as the swash plate 201 rotates. The translational forces exerted on the pistons 202, 203 cause them to move within their cylinders. Other embodiments of the present invention may comprise more than two pistons, wherein each piston is engaged with the swash plate by a pair of shoes according to the present invention.

One embodiment of the present invention comprises the manufacturing of a bearing. In one embodiment, manufacture of a bearing that includes a plastic material comprising EP79™, PTFE, and carbon fiber may be accomplished by injection molding. For example, a quantity of plastic material may be melted and injected into a mold with a desired shape for the bearing. For example, in one method of manufacture according to the present invention, a suitable mold may have a substantially hemispherical cavity for molding a bearing according to embodiments of the present invention.

In another embodiment of the present invention, manufacture of a bearing may be accomplished by machining a quantity of solid plastic material, such as a plastic material comprising EP79™, PTFE, and carbon fiber, into the desired shape. For example, the bearing shown in FIGS. 1A-F may have been manufactured by machining a quantity of plastic material to create a bearing according to embodiments of the present invention.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the this invention.

That which is claimed is:

1. a bearing for a piston engine comprising:
a bearing comprising a plastic material and having a substantially planar base and a substantially hemispherical portion, the base configured to engage with a swash plate and the hemispherical portion configured to engage with a piston, wherein the substantially planar base defines a first cavity and the hemispherical portion defines a second cavity, wherein the first cavity is configured to contain a lubricating fluid.

2. The bearing of claim 1, wherein the plastic material comprises a polyamide-imide.

3. The bearing of claim 2, wherein the polyamide-imide comprises EP79™.

4. The bearing of claim 1, wherein the plastic material comprises at least one of polyphenylene sulfide, polyether ether ketone or polyimide.

5. The bearing of claim 1, wherein the plastic material comprises between approximately 20-30% by weight PTFE and carbon fiber.

6. The bearing of claim 5 wherein the ratio of PTFE to carbon fiber is approximately 1:1.

7. The bearing of claim 1 wherein the plastic material has a glass transition temperature between approximately 250 degrees and 350 degrees Celsius, a specific gravity between approximately 1.25 and 1.75, a compressive strength between approximately 17 ksi and 25 ksi, a tensile strength between approximately 12 ksi and 18 ksi, and a heat deflection temperature between approximately 250 degrees and 325 degrees Celsius.

8. An engine, comprising:
at least one piston;
a swash plate;
a bearing configured to engage between the swash plate and the piston, the bearing having a substantially planar base that defines a first cavity configured to contain a lubricating fluid, and a substantially hemispherical portion; the base configured to engage with the swash plate and the substantially hemispherical portion configured to engage with the piston, wherein the bearing comprises a plastic material and the hemispherical portion includes a second cavity.

9. The bearing of claim 8, wherein the plastic material comprises a polyamide-imide.

10. The bearing of claim 9, wherein the polyamide-imide comprises EP79™.

11. The bearing of claim 8, wherein the plastic material comprises at least one of polyphenylene sulfide, polyether ether ketone, or poly-imide.

12. The bearing of claim 8, wherein the plastic material comprises PTFE and carbon fiber.

13. The bearing of claim 8, wherein the plastic material comprises at least one of PTFE, carbon fiber, graphite, molybdenum disulfide, bronze, or Kevlar™.

14. The bearing of claim 8 wherein the plastic material has a glass transition temperature between approximately 250 degrees and 350 degrees Celsius, a specific gravity between approximately 1.25 and 1.75, a compressive strength between approximately 17 ksi and 25 ksi, a tensile strength between approximately 12 ksi and 18 ksi, and a heat deflection temperature between approximately 250 degrees and 325 degrees Celsius.

* * * * *